US012639035B2

(12) United States Patent
An et al.

(10) Patent No.: US 12,639,035 B2
(45) Date of Patent: May 26, 2026

(54) METHOD AND SYSTEM FOR VECTOR RETRIEVAL ACCELERATION

(71) Applicant: MONTAGE TECHNOLOGY CO., LTD., Shanghai (CN)

(72) Inventors: Douwa An, Shanghai (CN); Yishan Lin, Shanghai (CN); Shuangshuang Li, Shanghai (CN); Zhaohui Du, Shanghai (CN); Yang Feng, Shanghai (CN); Wei Gao, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/981,904

(22) Filed: Dec. 16, 2024

(65) Prior Publication Data

US 2025/0208830 A1 Jun. 26, 2025

(30) Foreign Application Priority Data

Dec. 22, 2023 (CN) .......................... 202311789155.3

(51) Int. Cl.
*G06F 16/00* (2019.01)
*G06F 7/08* (2006.01)
*G06F 16/2455* (2019.01)

(52) U.S. Cl.
CPC ............. *G06F 7/08* (2013.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 2008/0168059 | A1* | 7/2008 | Hoashi | G06F 16/683 |
| 2015/0213375 | A1* | 7/2015 | Malewicz | G06F 16/137 |
| | | | | 707/737 |
| 2016/0062731 | A1* | 3/2016 | Lin | G06F 16/319 |
| | | | | 707/742 |
| 2017/0140012 | A1* | 5/2017 | Bortnikov | G06V 10/763 |
| 2018/0032579 | A1* | 2/2018 | Higuchi | G06F 16/2453 |
| 2021/0294780 | A1* | 9/2021 | Lifsches | G06F 16/2468 |
| 2023/0161811 | A1* | 5/2023 | Peng | G06F 16/56 |
| | | | | 707/749 |

* cited by examiner

*Primary Examiner* — Anhtai V Tran
(74) *Attorney, Agent, or Firm* — Oliff PLC

(57) ABSTRACT

A method and system for vector retrieval acceleration includes at least one calculation module and at least one sorting acceleration module. Each calculation module includes a first receiving end and a second receiving end for receiving query vector blocks and center vector blocks respectively, and performs operations on the received query vector blocks and center vector blocks, so as to obtain distance calculation results between each query vector and all center vectors, sorting acceleration module. The at least one calculation module corresponds one-to-one with the at least one sorting acceleration module. Each sorting acceleration module receives the distance calculation results output by the corresponding calculation module, sorts the distance calculation results, so as to obtain a sorting intermediate state, and then stores sorting intermediate states into a system memory.

18 Claims, 3 Drawing Sheets dividing $nq$ query vectors into $nq/n$ query vector blocks $x_q0$, $x_q1$, ..., $x_q(\frac{nq}{n}-1)$, and dividing $nlist$ center vectors in a center vector database into $nlist/m$ center vector blocks $C_k0$, $C_k1$, ..., $C_k(\frac{nlist}{m}-1)$, wherein each query vector block comprises $n$ query vectors, and each center vector block comprises $m$ center vectors, wherein $nq$, $nlist$, $m$, and $n$ are integers greater than or equal to 1 by at least one calculation module, respectively receiving center vector block $C_k0$, center vector block $C_k1$, ..., and center vector block $C_k(\frac{nlist}{m}-1)$ from the center vector database and performing operations on each center vector block of the center vector block $C_k0$, center vector block $C_k1$, ..., and center vector block $C_k(\frac{nlist}{m}-1)$ with query vector block $x_q0$, query vector block $x_q1$, ..., and query vector block $x_q(\frac{nq}{n}-1)$, so as to obtain distance calculation results between each query vector and all center vectors by at least one sorting acceleration module, obtaining the distance calculation results of the center vector blocks and the query vector blocks from a corresponding calculation module and performing sorting based on the distance calculation results, to obtain a sorting result corresponding to each query vector dividing $nq$ query vectors into $nq/n$ query vector blocks $x_q0$, $x_q1$, ..., $x_q(\frac{nq}{n} - 1)$, and dividing $nlist$ center vectors in a center vector database into $nlist/m$ center vector blocks $C_k0$, $C_k1$,..., $C_k(\frac{nlist}{m} - 1)$, wherein each query vector block comprises $n$ query vectors, and each center vector block comprises $m$ center vectors, wherein $nq$, $nlist$, $m$, and $n$ are integers greater than or equal to 1

— 101 by at least one calculation module, respectively receiving center vector block $C_k0$, center vector block $C_k1$, ..., and center vector block $C_k(\frac{nlist}{m} - 1)$ from the center vector database and performing operations on each center vector block of the center vector block $C_k0$, center vector block $C_k1$, ..., and center vector block $C_k(\frac{nlist}{m} - 1)$ with query vector block $x_q0$, query vector block $x_q1$,..., and query vector block $x_q(\frac{nq}{n} - 1)$, so as to obtain distance calculation results between each query vector and all center vectors

— 102 by at least one sorting acceleration module, obtaining the distance calculation results of the center vector blocks and the query vector blocks from a corresponding calculation module and performing sorting based on the distance calculation results, to obtain a sorting result corresponding to each query vector

METHOD AND SYSTEM FOR VECTOR RETRIEVAL ACCELERATION

CROSS-REFERENCE TO PRIOR APPLICATION

This application claims priority to Chinese Application No. 202311789155.3 filed on Dec. 22, 2023, which is incorporated herein by reference in its entirety.

TECHNICAL FIELD

This application relates to the field of computer technology, particularly to a method and system for vector retrieval acceleration.

BACKGROUND

In business scenarios such as image search, video recommendation, and text retrieval, it is often essential to obtain corresponding target samples from massive data samples stored in a database. At present, vector retrieval algorithms are commonly used to meet the requirements of these business scenarios based on the similarity between vector data.

The retrieval algorithm based on Inverted file system product quantization (IVFPQ) includes two parts: a coarse search and a fine search. In the coarse search, several clusters closest to a query vector are selected from a plurality of clusters formed by clustering in the vector database, while in the fine search, the top k vectors closest to the query vector are searched from all the vectors of several clusters selected during the coarse search. The essential of the coarse search is to calculate distance between each query vector and the vector corresponding to each cluster center (also known as "center vector") respectively, and nprobe center vectors closest to the query vector are selected. FIG. 1 shows the calculation process of the coarse search design of the IVFPQ. As shown in FIG. 1, each query vector is sequentially input in series to RISC-V VPU (vector processing unit). Corresponding to each input query vector, the RISC-V VPU will load an entire center vector database (XC database) from a DDR to calculate the distances between the query vector and all center vectors in the database, and a distance sorting process is performed via the sorting acceleration module.

It can be seen that there are a plurality of query vectors, and the distance calculation process needs to repeatedly load the XC database. As the size of the XC database increases, the time required to load the XC database from the DDR to the local location will become longer, and the time required for the coarse search will also increase rapidly. Therefore, the need to repeatedly load the entire XC database from the DDR for each query has become a performance bottleneck, and also reduces the processing speed of the entire hardware computing system.

This section aims to provide background or context for an implementation of the application stated in the claims. The description here should not be considered prior art merely because it is included in this section.

SUMMARY OF THE INVENTION

An object of this application is to provide a method and system for vector retrieval acceleration, which only needs to load the center vector database once during the coarse search, thereby reducing the time required for the coarse search and improving the processing speed of the hardware computing system.

In an exemplary embodiment, the application provides a method for vector retrieval acceleration, comprising:

at least one calculation module, each calculation module comprises a first receiving end and a second receiving end for receiving a query vector block(s) and a center vector block(s) respectively, and performs operations on received query vector blocks and center vector blocks, so as to obtain a distance calculation result(s) between each query vector and all center vectors, wherein nq query vectors are divided into nq/n query vector blocks $x_q0$, $x_q1$, . . . , $$x_q\left(\frac{nq}{n} - 1\right),$$

nlist center vectors in a center vector database are divided into nlist/m center vector blocks $C_k0$, $C_k1$, . . . , $$C_k\left(\frac{nlist}{m} - 1\right).$$

each query vector block includes n query vectors, and each center vector block includes m center vectors, wherein nq, nlist, m, and n are integers greater than or equal to 1; and at least one sorting acceleration module, wherein the at least one calculation module corresponds one-to-one with the at least one sorting acceleration module, wherein each sorting acceleration module receives the distance calculation results output by a corresponding calculation module, sorts the distance calculation results, so as to obtain a sorting intermediate state, and then stores sorting intermediate states into a system memory.

According to one embodiment, the calculation module performs operations on the center vector blocks and the query vector blocks, comprising: performing matrix multiplication operations on the query vector blocks and the center vector blocks, so as to obtain matrix multiplication results, and adding each element in the matrix multiplication results to a square of the corresponding center vector to obtain the distance calculation results.

According to one embodiment, the second receiving end of each calculation module receives its corresponding center vector block from the center vector database, for the corresponding center vector block, the first receiving end of each calculation module sequentially receives each query vector block, so that each calculation module can perform operations on its corresponding center vector block with all query vector blocks;

wherein, different calculation modules correspond to different center vector blocks.

According to one embodiment, the first receiving ends of all calculation module are connected together and receive the same query vector block at the same time.

According to one embodiment, the system further comprises a final sorting module, wherein the final sorting module obtains the sorting intermediate states from all sorting acceleration modules and performs sorting according to the sorting intermediate states to obtain a sorting result corresponding to each query vector.

According to one embodiment, the first receiving end of each calculation module receives its corresponding query vector block, for the corresponding query vector block, the second receiving end of each calculation module sequentially receives each center vector block, so that each calculation module can perform operations on its corresponding query vector block with all center vector blocks;

wherein, different calculation modules correspond to different query vector blocks.

According to one embodiment, each calculation module is connected via a bus; each calculation module receives different center vector blocks from the center vector database separately via its second receiving end, and sequentially flows the received center vector blocks among the calculation modules via the bus, so that each calculation module can receive different center vector blocks sequentially.

According to one embodiment, the sorting acceleration module loads the sorting intermediate states from the system memory and sorts the sorting intermediate states together with the distance calculation result from the calculation module or a local memory to obtain new sorting intermediate states, and updates the sorting intermediate states stored in the system memory with the new sorting intermediate states.

According to one embodiment, each sorting acceleration module obtains the sorting intermediate state in the last sorting as a sorting result of the query vector in the query vector block received by the corresponding calculation module.

According to one embodiment, the system further comprises a local memory, and the distance calculation results calculated by the calculation modules are stored in the local memory and output to the corresponding sorting acceleration module via the local memory.

In another exemplary embodiment, the application provides a system for vector retrieval acceleration, comprising:

dividing nq query vectors into nq/n query vector blocks $x_q0$, $x_q1$, . . . , $$x_q\left(\frac{nq}{n}-1\right),$$

and dividing nlist center vectors in a center vector database into nlist/m center vector blocks $C_k0$, $C_k1$, . . . , $$C_k\left(\frac{nlist}{m}-1\right),$$

wherein each query vector block includes n query vectors, and each center vector block includes m center vectors, wherein nq, nlist, m, and n are integers greater than or equal to 1;

by at least one calculation module, respectively receiving center vector block $C_k0$, center vector block $C_k1$, . . . , and center vector block $$C_k\left(\frac{nlist}{m}-1\right)$$

4 from the center vector database and performing operations on each center vector block of the center vector block $C_k0$, center vector block $C_k1$, . . . , and center vector block $$C_k\left(\frac{nlist}{m}-1\right)$$

with query vector block $x_q0$, $$x_q\left(\frac{nq}{n}-1\right),$$

query vector block $x_q1$, . . . , and query vector block so as to obtain distance calculation results between each query vector and all center vectors; and by at least one sorting acceleration module obtaining the distance in calculation results of the center vector blocks and the query vector blocks from a corresponding calculation module and performing sorting based on the distance calculation results, to obtain a sorting result corresponding to each query vector.

According to one embodiment, performing operations on each center vector block with query vector block $x_q0$, query vector block $x_q1$, . . . , and query vector block $$x_q\left(\frac{nq}{n}-1\right)$$

respectively, comprising:

performing matrix multiplication operations on each center vector block with the query vector block $x_q0$, query vector block $x_q1$, . . . , and query vector block $$x_q\left(\frac{nq}{n}-1\right)$$

respectively, so as to obtain matrix multiplication results, and adding each element in matrix multiplication results to a square of the corresponding center vector to obtain the distance calculation results.

According to one embodiment, performing matrix multiplication operations on each center vector block with the query vector block $x_q0$, query vector block $x_q1$, . . . , and query vector block $$x_q\left(\frac{nq}{n}-1\right)$$

respectively, comprising:

inputting the center vector block $C_k0$, center vector block $C_k1$, . . . , and center vector block $$C_k\left(\frac{nlist}{m}-1\right)$$

into the corresponding calculation module of the at least one calculation module respectively; and for each calculation module, inputting the query vector block $x_q0$, query vector block $x_q1$, . . . , and query vector block $$x_q\left(\frac{nq}{n} - 1\right)$$

in sequence, so that each calculation module calculates a matrix product of the corresponding center vector block and all query vector blocks.

According to one embodiment, performing matrix multiplication operations on each center vector block with the query vector block $x_q 0$, query vector block $x_q 1$, . . . , and query vector block $$x_q\left(\frac{nq}{n} - 1\right)$$

respectively, comprising:

inputting the query vector block $x_q 0$, query vector block $x_q 1$, . . . , and query vector block $$x_q\left(\frac{nq}{n} - 1\right)$$

into the corresponding calculation module of at least one calculation module respectively; and for each calculation module, inputting the center vector block $C_k 0$, center vector block $C_k 1$, . . . , and center vector block $$C_k\left(\frac{nlist}{m} - 1\right)$$

sequentially, so that each calculation module calculates the matrix product of the corresponding query vector block and all center vector blocks.

According to one embodiment, via at least one sorting acceleration module, obtaining the distance calculation results of the center vector block and the query vector block from the corresponding calculation module, and performing sorting based on the distance calculation results, comprising:

the sorting acceleration module performs sorting based on the distance calculation results received from the corresponding calculation module or a local memory and the sorting intermediate state obtained from the system memory to generate new sorting intermediate states, and updates the sorting intermediate state stored in the system memory with the new sorting intermediate state.

According to one embodiment, sorting based on the distance calculation results to obtain sorting results corresponding to each query vector, comprising:

taking the sorting intermediate state obtained by each sorting acceleration module in the last sorting as the sorting result of the corresponding query vector in the query vector block received by the corresponding calculation module.

According to one embodiment, performing sorting based on the distance calculation results to obtain the sorting results corresponding to each query vector, comprising: obtaining the sorting intermediate states of all sorting acceleration modules and sorting according to the sorting intermediate states to obtain the sorting results corresponding to each query vector via a final sorting module.

In yet another exemplary embodiment, the present disclosure also provides a computer-readable storage medium having computer-executable instructions stored therein which are executed by a processor to implement the steps in the methods described above.

In the embodiments of the present application, the center vector database is only required to be loaded once during the coarse search, which can reduce the time required for the coarse search and improve the processing speed of the hardware computing system.

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

BRIEF DESCRIPTION OF THE FIGURES

FIG. 5 is a flowchart of a method for vector retrieval acceleration according to an embodiment of this application.

DETAILED DESCRIPTION

Figure 1:
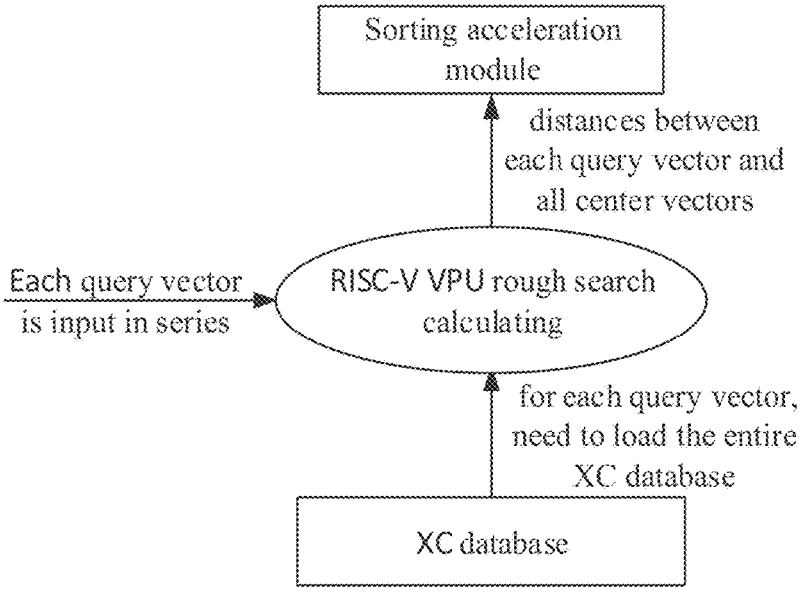
FIG. 1 is a schematic diagram of the calculation process of traditional coarse search design of the IVFPQ.

In the following description, numerous technical details are set forth in order to provide the readers with a better understanding of the present application. However, those skilled in the art can understand that the technical solutions claimed in the present application can be implemented without these technical details and various changes and modifications based on the following embodiments.

In order to make the objects, technical solutions and advantages of the present application more clear, embodiments of the present application will be further described in detail below with reference to the accompanying drawings.

The existing vector retrieval schemes need to load the entire center vector database once for each query vector input during the coarse search. The repeated loading of the database results in a rapid increase in retrieval time as the size of the database increases, which in turn affects the processing speed of hardware computing system.

Based on this problem, this application proposes a method and system for vector retrieval acceleration, which only needs to load the XC database once during the coarse search, greatly reducing the time required for the coarse search and improving the processing speed of the hardware computing system.

During the coarse search stage, the distances between each query vector $x_q$ of the query vectors $x_{q_0}, x_{q_1}, \ldots, x_{q_{nq-1}}$ and all center vectors $C_{k_0}, C_{k_1}, \ldots, C_{k_{nlist-1}}$ are calculated and nprobe center vectors closest to each query vector are selected, wherein nq is the number of query vectors, nlist is the number of center vectors, and nq and nlist both are integers greater than or equal to 1. There are various formulas for calculating the distances between query vectors and center vectors, such as inner product distance calculation formula, Euclidean distance calculation formula, etc. The following is an example of the Euclidean distance calculation formula, as shown in equation (1):

$$D(x_q, C_k) = \sum_{i=1}^{d}(x_{q,i} - C_{k,i})^2 = \sum_{i=1}^{d}x_{q,i}^2 - 2\sum_{i=1}^{d}x_{q,i}C_{k,i} + \sum_{i=1}^{d}C_{k,i}^2 \quad (1)$$

Wherein, d refers to a vector dimension, and d is an integer greater than or equal to 1.

From the equation (1), it can be seen that for a specific query vector $x_q$, the difference in distance between the query vector $x_q$ and each center vector depends on the second term $$\left(2\sum_{i=1}^{d}x_{q,i}C_{k,i}^2\right)$$

and the third term $$\left(\sum_{i=1}^{d}C_{k,i}^2\right),$$

while the third term is the square of the center vector $C_k$, and its size depends on the center vector itself. Therefore, the calculation process of the distance between the query vector $x_q$ and the center vector $C_k$ mainly involves calculating the product of the query vector and the center vector $$C_k \cdot x_q = \sum_{i=1}^{d}x_{q,i}C_{k,i}^2,$$

then adding the square of the corresponding center vector to the product.

In one embodiment, the calculation process of the product of each query vector $x_q$ with all center vectors $C_{k_0}, C_{k_1}, \ldots, C_{k_{nlist-1}}$ is transformed into calculating the product of a nlist×d first matrix $$\begin{bmatrix} C_{k_0} \\ C_{k_1} \\ \ldots \\ C_{k_{nlist-1}} \end{bmatrix}$$

formed by all center vectors $C_{k_0}, C_{k_1}, \ldots C_{k_{nlist-1}}$ and a nq×d second matrix $[x_{q_0}, x_{q_1}, \ldots, x_{q_{nq-1}}]$ formed by all query vectors $x_{q_0}, x_{q_1}, \ldots, x_{q_{nq-1}}$, $$\begin{bmatrix} C_{k_0} \\ C_{k_1} \\ \ldots \\ C_{k_{nlist-1}} \end{bmatrix}[x_{q_0}, x_{q_1}, \ldots, x_{q_{nq-1}}] \quad (2)$$

Wherein, each row vector of the first matrix is a center vector, each column vector of the second matrix is a query vector, and d is the vector dimension. After calculating the product of the two matrices mentioned above, the product of any query vector and any center vector can be obtained. The matrix multiplication algorithm may be implemented through various matrix multiplication acceleration libraries.

After obtaining the product of the two matrices, the square of the corresponding center vector is added to each element of the matrix multiplication result of the query vector and the center vector, and then the distance calculation result is output to the sorting acceleration module for sorting. The sorting acceleration module can process the distance sorting of k query vectors in parallel, so sorting all query vectors can be completed through ceil (nq/k) (ceil( ) represents rounding up) sorting.

Considering that nlist and nq are relatively large, completing the product operation of the two matrices at once requires a large size of local memory. Therefore, in some embodiments, the two matrices can be divided first, such as the query vector matrix is divided into multiple query vector blocks, each of which can include n query vectors. Therefore, nq query vectors $x_{q_0}, x_{q_1}, \ldots, x_{q_{nq-1}}$ are divided into nq/n query vector blocks $x_q0, x_q1, \ldots,$ $$x_q\left(\frac{nq}{n} - 1\right);$$

Similarly, the center vector matrix can also be divided into multiple center vector blocks, each of which can include m center vectors, that is, nlist center vectors $C_{k_0}, C_{k_1}, \ldots, C_{k_{nlist-1}}$ are divided into nlist/m center vector blocks $C_k0, C_k1, \ldots,$ $$C_k\left(\frac{nlist}{m} - 1\right).$$

where m and n are integers greater than 1.

Figure 2:
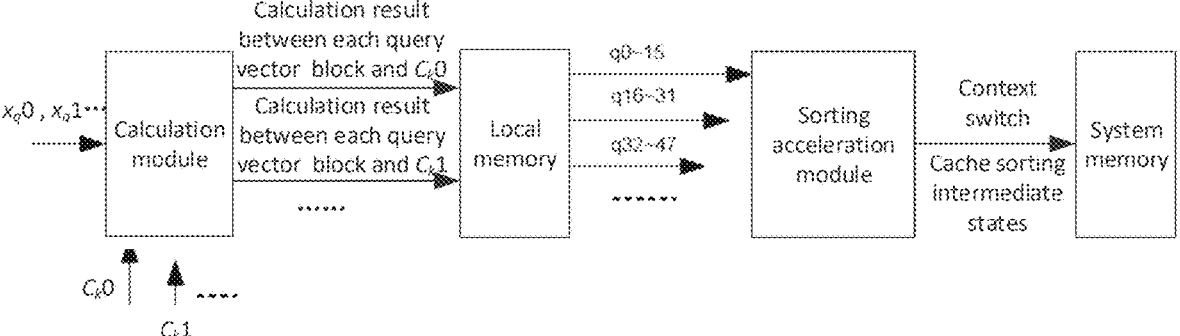
FIG. 2 is a block diagram of a system for vector retrieval acceleration according to an embodiment of this application.

This application provides a system for vector retrieval acceleration, which may include: at least one calculation module and at least one sorting acceleration module, the calculation module and the sorting acceleration module are connected in one-to-one correspondence. For simplicity, FIG. 2 illustrates a system for vector retrieval acceleration that includes only one calculation module and one sorting acceleration module. As shown in FIG. 2, one end of the sorting acceleration module is coupled to the calculation module, which is used to receive distance calculation results output by the calculation module and sort these results.

In some embodiments, each calculation module has a first receiving end and a second receiving end for receiving query vector blocks and center vector blocks respectively, and performs operations on the received query vector blocks and center vector blocks. The sorting acceleration module receives the distance calculation results output by the corresponding calculation module, and sorts these results. Then sorting intermediate states (i.e., sorting intermediate results) generated by sorting acceleration module during the sorting are saved to a system memory. The sorting intermediate states of each sorting acceleration module are stored in different storage locations of the system memory. The system memory may be, for example, DDR memory.

After the two matrices are divided, the center vector blocks and the query vector blocks are input into the at least one calculation module. The calculation module calculates the input center vector blocks and query vector blocks. In one embodiment, m center vectors in the center vector block are input in parallel to the calculation module, and n query vectors in the query vector block are input in parallel to the calculation module.

In one embodiment, performing operations on the center vector blocks and the query vector blocks comprises: performing matrix multiplication operations on the query vector blocks and the center vector blocks, and adding a square of the corresponding center vector to each element in matrix multiplication results to obtain the distance calculation results.

In some embodiments, the vector retrieval acceleration system may include a local memory, as shown in FIG. 2, the distance calculation results calculated by the calculation module can be stored in the local memory and output to the sorting acceleration module via the local memory. The local memory shown in FIG. 2 is a separate module, but the present application is not limited to this, and the local memory can be integrated into the calculation module.

The calculation module may load center vector blocks $C_k0, C_k1, \ldots,$ $$C_k\left(\frac{nlist}{m} - 1\right)$$

from the system memory. For each of the center vector blocks $C_kj$ (j=0, 1, . . . , $$\frac{nlist}{m} - 1)$$

input to the calculation module, it will be calculated with the query vector block $x_q0$, query vector block $x_q1, \ldots,$ and query vector block $$x_q\left(\frac{nq}{n} - 1\right),$$

respectively.

For example, performing operations on the center vector block $C_kj$ (=$C_{k_i}, C_{k_{i+1}}, \ldots, C_{k_{i+m-1}}$) and query vector block $x_q0$ (=$x_{q_s}, x_{q_{s+1}}, \ldots, x_{d_{s+n-1}}$) comprises performing matrix multiplication operations (equation (3)) on the center vector block $C_kj$ and the query vector block $x_q0$ to obtain the product of each query vector in the query vector block $x_q0$ with each center vector in the center vector block Cj, and then adding the square of the corresponding center vector to each product (each element in the matrix multiplication result), then the distance calculation results between n query vectors in the query vector block $x_q0$ and m center vectors in the center vector block $C_kj$ can be obtained. The distance calculation results can be cached in the local memory.

$$\begin{bmatrix} C_{k_1} \\ C_{k_{i+1}} \\ \cdots \\ C_{k_{i+m-1}} \end{bmatrix} \begin{bmatrix} x_{q_s}, x_{q_{s+1}}, \cdots, x_{q_{s+n-1}} \end{bmatrix} \tag{3}$$

After obtaining the distance calculation results between a query vector block and a center vector block, the sorting acceleration module can be used for sorting. The sorting acceleration module can process the sorting of k query vectors (as shown in FIG. 2 with k=16 as an example) in parallel. Therefore, when the number of query vectors in a query vector block n>k, the distance calculation results between a query vector block and a center vector block needs to be sorted ceil (n/k) times. Moreover, the sorting acceleration module can store sorting intermediate states of each sorting in the system memory, so that in the next sorting, the sorting acceleration module can load the sorting intermediate states from the system memory and sort the sorting intermediate states together with the distance calculation results from the calculation module or local memory to obtain new sorting intermediate states, and update the sorting intermediate states stored in the system memory with the new sorting intermediate states. The sorting acceleration module can sort the distance between the query vector and all center vectors and outputs the sorting intermediate state as the sorting result.

In one embodiment, after the sorting acceleration module sorts the distance calculation results of n query vectors corresponding to one vector query block, the calculation module will calculate the next query vector block and the corresponding center vector block, and repeat the above process until all query vector blocks are calculated. In some embodiments, the system for vector retrieval acceleration further includes a final sorting module, which can be one of multiple sorting acceleration modules or a sorting module provided separately. The final sorting module obtains the sorting intermediate states of all sorting acceleration modules and performs sorting according to the sorting intermediate states to obtain the sorting results corresponding to each query vector.

However, this embodiment of the present application is not limited to this. In practical applications, the calculation of the calculation module and the sorting of the sorting acceleration module are processed in a pipeline manner, that is, the calculation module can perform the next round of calculation while the sorting acceleration module is sorting the received distance calculation results. This method can hide the processing time of the sorting acceleration module, which is beneficial for improving efficiency.

In one embodiment, all query vectors $x_{q_0}, x_{q_1}, \ldots, x_{q_{nq-1}}$ can be divided into $$\frac{nq}{n} - 1$$

query vector blocks, and all center vectors $C_{k_0}$, $C_{k_1}$, . . . , $C_{k_{nlist-1}}$ in the center vector database can be divided into $$\frac{nlist}{m} - 1$$

center vector blocks. It should be understood that $$\frac{nq}{n} - 1 \text{ and } \frac{nlist}{m} - 1$$

may be integers greater than 1, where, $$\frac{nq}{n} - 1$$

for example may be 32, 16, 8, 4, etc., $$\frac{nlist}{m} - 1$$

for example may be 32, 16, 8, 4, etc.

For the sake of convenience, the following will take $$\frac{nq}{n} - 1 = \frac{nlist}{m} - 1 = 16$$

as an example for explanation. However, those skilled in the art can understand that the embodiments of this application do not impose any limitations on the size of $$\frac{nq}{n} - 1, \frac{nlist}{m} - 1$$

and whether they are equal.

Figure 3:
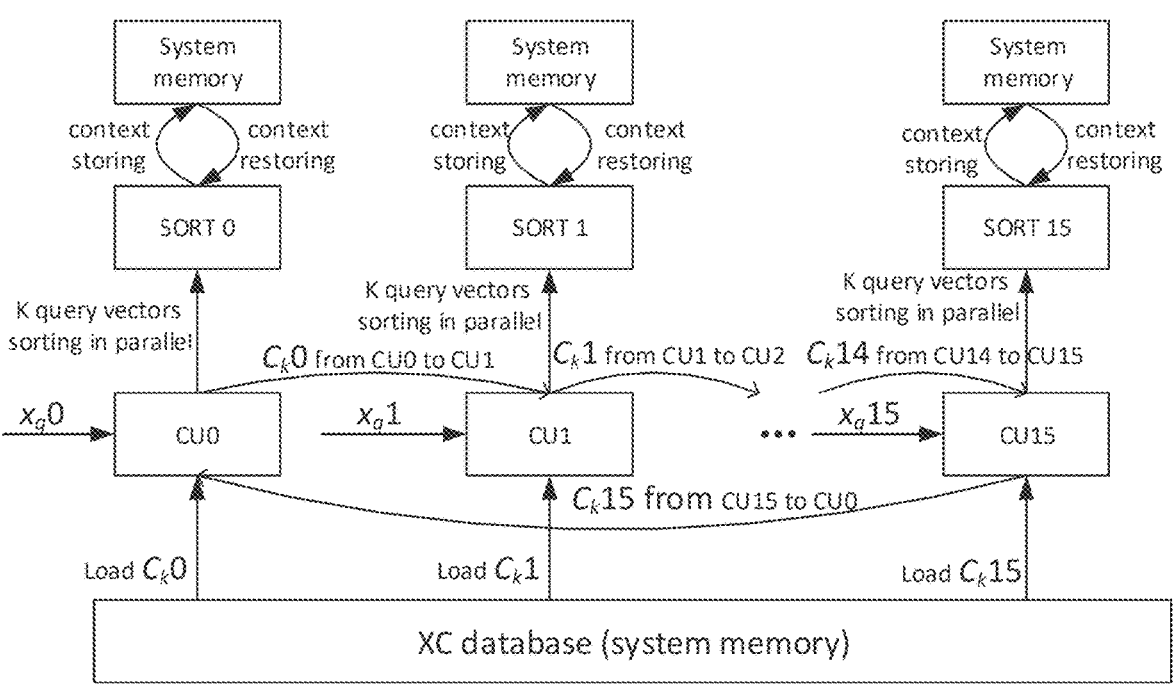
FIG. 3 is a schematic diagram of a matrix multiplication and sorting process between each of a plurality of query vector blocks and each of the center vector blocks according to an embodiment of this application.

FIG. 3 illustrates an exemplary system for vector retrieval acceleration comprising multiple calculation modules and multiple sorting acceleration modules according to another embodiment of the present application. In the system for vector retrieval acceleration, multiple calculation modules can be calculation modules CU0 to CU15, and each calculation module corresponds to one of the sorting acceleration modules SORT0 to SORT15. Each calculation module receives query vector blocks at its first receiving end and center vector blocks at its second receiving end. Each calculation module calculates the distances between each query vector in the query vector block and all center vectors in the center vector block based on the received query vector blocks and center vector blocks, so as to obtain distance calculation results. The calculation modules can be connected through a bus for transmission of the vector blocks, and the calculation results of the calculation modules can be stored in the local memory (not shown in the figure). The local memory may be independent components or integrated into the calculation modules. The sorting acceleration modules can support parallel sorting of k query vectors, that is, it can simultaneously process the sorting of the distance calculation results corresponding to k query vectors, and store the sorting intermediate states in the system memory.

At the beginning, the first receiving ends of calculation modules CU0 to CU15 receive the query vector blocks $x_q0$, $x_q1$, . . . , $x_q15$ respectively, while the second receiving ends of calculation modules CU0 to CU15 receive the center vector blocks $C_k0$, $C_k1$, . . . , $C_k15$ respectively from the center vector database (XC database). In the first round of calculations, the calculation modules CU0 to CU15 calculate $x_q0$ with $C_k0$, $x_q1$ with $C_k1$, . . . , $x_q15$ with $C_k15$ respectively.

In the following calculations, the center vector blocks $C_k0$, $C_k1$, . . . , and $C_k15$ flow sequentially between the calculation modules CU0 to CU15 through the bus between the calculation modules, so that each query vector block can performs matrix multiplication operation with the center vector blocks $C_k0$, $C_k1$, . . . , and $C_k15$, respectively.

Specifically, in the second round of calculation, the calculation module CU0 transfers its center vector block $C_k0$ to the calculation module CU1, the calculation module CU1 transfers its center vector block $C_k1$ to the calculation module CU2, . . . , and the calculation module CU15 transfers its center vector block $C_k15$ to the calculation module CU0. The calculation modules CU0 to CU15 calculate $x_q0$ with $C_k15$, $x_q1$ with $C_k0$, . . . , $x_q15$ with $C_k14$ respectively. In the third round of calculation, the calculation module CU0 transfers its center vector block $C_k15$ to the calculation module CU1, and the calculation module CU1 transfers its center vector block $C_k0$ to the calculation module CU2, . . . , the calculation module CU15 transfers its center vector block $C_k14$ to the calculation module CU0, and the calculation modules CU0 to CU15 calculate $x_q0$ with $C_k14$, $x_q1$ with $C_k15$, . . . , $x_q15$ with $C_k13$ respectively. Similarly, in the final round of calculation, the calculation module CU0 transfers its center vector block $C_k2$ to the calculation module CU1, the calculation module CU1 transfers its center vector block $C_k3$ to the calculation module CU2, . . . , and the calculation module CU15 transfers its center vector block $C_k1$ to the calculation module CU0. The calculation modules CU0 to CU15 calculate $x_q0$ with $C_k1$, $x_q1$ with $C_k2$, . . . , $x_q15$ with $C_k0$ respectively. Finally, each query vector block has been calculated with all center vector blocks, or each center vector block has been calculated with all query vector blocks.

The sorting acceleration module sorts the distance calculation results, including sorting based on the distance calculation results received from the corresponding calculation module or the local memory and the sorting intermediate states obtained from the system memory, to generate a new sorting intermediate state, and updates the stored sorting intermediate states in the system memory with the new sorting intermediate states. It should be noted that at the beginning, the sorting intermediate states are empty.

The sorting acceleration module takes the sorting intermediate states derived from sorting the distance calculation results output from the last round of calculation of the corresponding calculation module and the sorting intermediate states obtained from the system memory as the sorting results corresponding to each query vector of the received the query vector block.

In this embodiment, the query vector block received by the first receiving end of each calculation module remains unchanged, while the second receiving end receives different center vector blocks.

Figure 4:
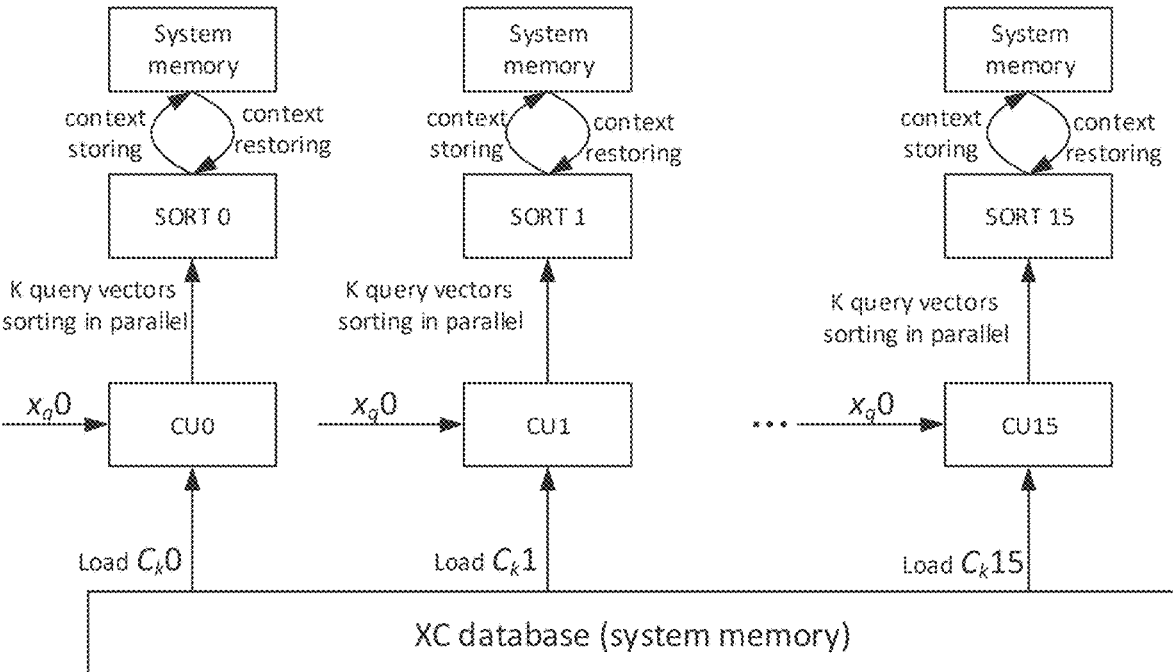
FIG. 4 is a schematic diagram of stage 1 of the matrix multiplication and sorting process between each of a plurality of query vector blocks and each of the center vector blocks in the case that the size of the query vector blocks and the center vector blocks are both very large according to an embodiment of this application.

FIG. 4 illustrates an exemplary system for vector retrieval acceleration comprising multiple calculation modules and multiple sorting acceleration modules according to another embodiment of the present application. The difference between FIG. 4 and FIG. 3 is that the system for vector retrieval acceleration may also include a final sorting module (not shown in the figure), and the first receiving ends of the calculation modules may be connected together to receive the same query vector block.

At the beginning, the first receiving ends of calculation modules CU0 to CU15 all receive query vector block $x_q0$, while the second receiving ends of calculation modules CU0 to CU15 receive center vector blocks $C_k0$, $C_k1$, . . . , and $C_k15$ respectively from the center vector database (XC database). In the first round of calculation, the calculation modules CU0 to CU15 calculate $x_q0$ with $C_k0$, $x_q0$ with $C_k1$, . . . , $x_q0$ with $C_k15$ respectively (FIG. 4 is a schematic diagram of the first round). In the second round of calculation, the first receiving ends of calculation modules CU0 to CU15 all receive query vector block $x_q1$. The calculation modules CU0 to CU15 calculate $x_q1$ with $C_k0$, $x_q1$ with $C_k1$, . . . , $x_q1$ with $C_k15$ respectively, and so on. In the last round of calculation, the first receiving ends of calculation modules CU0 to CU15 all receive query vector block $x_q15$. The calculation modules CU0 to CU15 calculate $x_q15$ with $C_k0$, $x_q15$ with $C_k1$, . . . , $x_q15$ with $C_k15$ respectively. Finally, each query vector block has been calculated with all center vector blocks, or each center vector block has been calculated with all query vector blocks.

The final sorting module obtains the sorting intermediate states of all sorting acceleration modules and performs sorting according to the sorting intermediate states to obtain the sorting results corresponding to each query vector.

In this embodiment, the first receiving end of each calculation module receives different query vector blocks, while the center vector block received by the second receiving end remains unchanged.

In another embodiment, if the center vectors $C_{k_0}$, $C_k1$, . . . , $C_{k_{nlist-1}}$ are divided into 32 or more center vector blocks, the calculation module needs 2 or more rounds to receive the center vector blocks. For example, in combination with FIG. 4, taking an example of dividing the center vector into 32 center vector blocks $C_k0$ to $C_k31$, in the first round, 16 calculation modules CU0 to CU15 respectively receive center vector blocks $C_k0$ to $C_k15$ from the XC database respectively, and t (t greater than or equal to 1) query vector blocks $x_q0$ to $x_q(t-1)$ are sequentially input into the first receiving ends of calculation modules CU0 to CU15 for calculation. Next, in the second round, the calculation modules CU0 to CU15 respectively receive center vector blocks $C_k16$ to $C_k31$ from the XC database, and t query vector blocks $x_q0$ to $x_q(t-1)$ are sequentially input into the first receiving ends of calculation modules CU0 to CU15 for calculation. After 2 rounds, the calculation between each query vector block and all center vector blocks $C_k0$ to $C_k31$ can be completed, and the corresponding sorting results can be obtained.

In other embodiments, in combination with FIG. 4, if the center vector $C_{k_0}$, $C_{k_1}$, . . . , $C_{k_{nlist-1}}$ are divided into 2, 4, or 8 center vector blocks, then 16 calculation modules can support 8, 4, or 2 coarse search tasks in parallel. Alternatively, if the center vector $C_{k_0}$, $C_{k_1}$, . . . , $C_{k_{nlist-1}}$ are not divided, one calculation module can complete one coarse search task, and 16 calculation modules can support 16 coarse search tasks in parallel.

Figure 5:
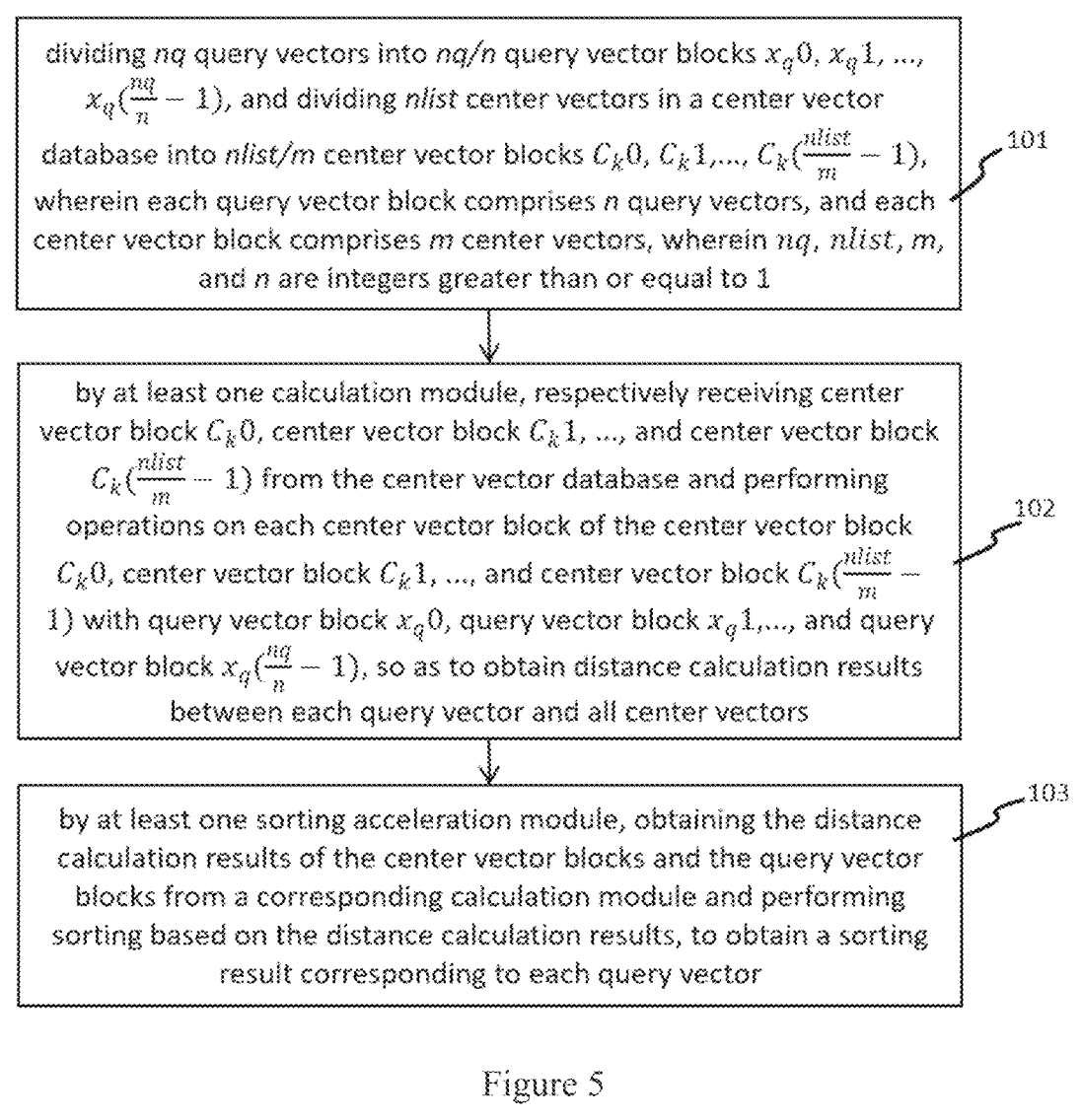

The following will explain the process of the method for vector retrieval acceleration in the embodiment of the present application, as shown in FIG. 5. The method can be applied to the system for vector retrieval acceleration mentioned above, the method includes:

Step 101, dividing nq query vectors into nq/n query vector blocks $x_q0$, $x_q1$, . . . , $$x_q\left(\frac{nq}{n}-1\right),$$

and dividing nlist center vectors in a center vector database into nlist/m center vector blocks $C_k0$, $C_k1$, . . . , $$C_k\left(\frac{nlist}{m}-1\right),$$

each query vector block includes n query vectors, and each center vector block includes m center vectors, wherein nq, nlist, m, and n are integers greater than or equal to 1.

Step 102, by at least one calculation module, respectively receiving center vector block $C_k0$, center vector block $C_k1$, . . . , and center vector block $$C_k\left(\frac{nlist}{m}-1\right)$$

from the center vector database, and performing operations on each center vector block of the center vector block $C_k0$, center vector block $C_k1$, . . . , and center vector block $$C_k\left(\frac{nlist}{m}-1\right)$$

with query vector block $x_q0$, query vector block $x_q1$, . . . , and query vector block $$x_q\left(\frac{nq}{n}-1\right)$$

respectively, so as to obtain distance calculation results between each query vector and all center vectors; and Step 103, by at least one sorting acceleration module, obtaining the distance calculation results of the center vector block and the query vector block from the corresponding calculation module and performing sorting based on the distance calculation results, so as to obtain the sorting result corresponding to each query vector.

In the step 102, performing operations on each center vector block with query vector block $x_q0$, query vector block $x_q1$, . . . , and query vector block $$x_q\left(\frac{nq}{n}-1\right)$$

respectively includes: performing matrix multiplication operations on each center vector block with the query vector block $$x_q\left(\frac{nq}{n}-1\right)$$

respectively, so as to obtain matrix multiplication results, and adding a square of the corresponding center vector to each element in the matrix multiplication results to obtain the distance calculation results.

In some embodiments, performing matrix multiplication operations on each center vector block with the query vector block $x_q0$, query vector block $x_q1$, . . . , and query vector block $$x_q\left(\frac{nq}{n} - 1\right)$$

respectively can be accomplished by following the steps:

Step 1021, inputting the center vector block $C_k0$, center vector block $C_k1$, . . . , and center vector block $$C_k\left(\frac{nlist}{m} - 1\right)$$

into the corresponding calculation modules of at least one calculation module, respectively.

Step 1022, for each calculation module, inputting the query vector block $x_q0$, query vector block $x_q1$, . . . , and query vector block $$x_q\left(\frac{nq}{n} - 1\right)$$

in sequence, so that each calculation module calculates the matrix products of the corresponding center vector block and all query vector blocks.

In other embodiments, performing matrix multiplication operations on each center vector block with the query vector block $x_q0$, query vector block $x_q1$, . . . , and query vector block $$x_q\left(\frac{nq}{n} - 1\right)$$

respectively can be implemented by following the steps:

Step 1021', inputting the query vector block $x_q0$, query vector block $x_q1$, . . . , and query vector block $$x_q\left(\frac{nq}{n} - 1\right)$$

into the corresponding calculation module of at least one calculation module, respectively.

Step 1022', for each calculation module, inputting the center vector block $C_k0$, center vector block $C_k1$, . . . , and center vector block $$C_k\left(\frac{nlist}{m} - 1\right)$$

in sequence, so that each calculation module calculates the matrix multiplication products of the corresponding query vector block and all center vector blocks.

It can be understood that in the step 1022, after calculating the matrix multiplication of one query vector block and one center vector block, the calculation module can add the square of the corresponding center vector to the product of any query vector in the query vector block and any center vector in the center vector block (any element of the matrix multiplication result) to obtain the distance calculation results.

After calculating one query vector block and one center vector block in the calculation module, the sorting acceleration module can perform sorting according to the distance calculation results, including:

Step 1031, the sorting acceleration module sorts based on the distance calculation results received from the corresponding calculation module or local memory and the sorting intermediate states obtained from the system memory to generate new sorting intermediate states, and updates the corresponding storage location of the system memory with the new sorting intermediate states. At the beginning, the sorting intermediate states are empty.

It can be understood that each query vector block contains n query vectors, so when the calculation module calculates one query vector block and one center vector block, the distance calculation results of n query vectors can be obtained. The sorting acceleration module can process the distance calculation results of k query vectors each time in parallel. If n is less than k, or the number of query vectors corresponding to the remaining distance calculation results in the current local memory is less than k, the sorting acceleration module can obtain the distance calculation results of all currently stored query vectors from the local memory; If n is greater than or equal to k, or the number of query vectors corresponding to the remaining distance calculation results in the current local memory is greater than or equal to k, the sorting acceleration module can obtain the distance calculation results of k query vectors from the local memory.

In some embodiments, the sorting acceleration module performs sorting based on the distance calculation results, further including:

Step 1032: the final sorting module obtains the sorting intermediate states of all sorting acceleration modules and performs sorting according to the sorting intermediate states to obtain the sorting results corresponding to each query vector.

In other embodiments, the sorting acceleration module performs sorting based on the distance calculation results, further including:

Step 1032': each sorting acceleration module sorts the distance between the corresponding query vector and all center vectors, so as to obtain sorting intermediate states, and outputs the sorting intermediate state as the sorting result corresponding to the query vector.

In this application, all query vectors are divided into multiple query vector blocks, and all center vectors in the center vector database are also divided into multiple center vector blocks. The calculation between each query vector block and each center vector block is carried out. The entire center vector library only needs to be loaded once in this process, eliminating the need for repeated loading, which greatly reduces the coarse search time.

Table 1 presents a comparison of the coarse search time and total time for the present embodiment using two different logics, VCORE and TCORE, with the coarse search time and total time of the traditional scheme shown in FIG. 1. It can be seen that in the present embodiment, both the coarse search time and the total time have decreased to different degrees. Wherein, SIFT10M is the name of the test database, nb represents the number of database vectors, here is 10M, d represents the dimension of each vector, M represents the parameter of how many segments a vector is divided into during PQ quantization, which is the number of PQ quantizers, code_num represents the number of quantized vectors in PQ quantizer, nq represents the number of query vectors, topk represents the number of vectors selected for final search, and nprobe represents the number of clusters selected for coarse search.

TABLE 1

Comparison of coarse search time and total time in the present embodiment with the traditional scheme shown in FIG. 1

| Nlist | Nprobe | Original coarse search time (ms) | A percentage of original coarse search time to total time | VCORE coarse search optimization time (ms) | A percentage of VCORE coarse search optimization time to total time | TCORE coarse search optimization time (ms) | A percentage of TCORE coarse search optimization time to total time | Original total time (ms) | VCORE optimization total time (ms) | TCORE optimization total time (ms) | recall |
|---|---|---|---|---|---|---|---|---|---|---|---|
| 1024 | 14 | 62.76 | 4.89% | 12.86 | 1.03% | 6.08 | 0.49% | 1283.37 | 1246.72 | 1242.42 | 0.96 |
| 2048 | 18 | 103.55 | 10.35% | 21.69 | 2.31% | 7.52 | 7.52% | 1000.83 | 939.08 | 925.67 | 0.95 |
| 4096 | 24 | 200.64 | 22.51% | 39.97 | 5.35% | 11.80 | 1.64% | 891.45 | 747.00 | 718.85 | 0.95 |
| 8192 | 34 | 419.64 | 39.91% | 75.56 | 11.03% | 18.38 | 2.93% | 1051.43 | 685.26 | 627.55 | 0.95 |
| 16384 | 52 | 1134.19 | 62.98% | 146.91 | 20.49% | 33.37 | 5.50% | 1800.94 | 716.91 | 606.52 | 0.95 |
| 32768 | 70 | 2398.63 | 77.60% | 291.08 | 35.39% | 193.41 | 14.98% | 3091.05 | 822.46 | 623.65 | 0.95 |
| 65536 | 94 | 4863.30 | 87.32% | 587.70 | 54.01% | 235.26 | 31.95% | 5569.73 | 1088.03 | 736.34 | 0.95 |

SIFT10M,
nb = 10M,
d = 128,
M = 32,
nq = 10000,
topk = 100,
codenum = 256

The method for vector retrieval acceleration of this application significantly reduces the coarse search time, improves the processing efficiency of the hardware computing system, and allows users to choose a larger number of center vectors nlist. A performance theoretical analysis of the overall system using the method for vector retrieval acceleration has been conducted, as shown in Tables 2 to 4. Search time for different systems under SIFT1M vector, SIFT10M vector, and SIFT100M vector, respectively are provided. Wherein, ABU2.0 in the table is the system that applies the method for vector retrieval acceleration proposed in this application, and when the bandwidth of the system ABU2.0 is only half of the dual Die H100 NVL, the performance of ABU2.0 can be comparable to that of the dual Die H100 NVL.

TABLE 2

Search time for different systems with 1M vectors

| | | Us/query | | | |
|---|---|---|---|---|---|
| Nlist | Nprobe | H100 PCIe | H100 SXM | H100 SXM | ABU2.0 (1.6 G) |
| 512 | 13 | 1.7768 | 1.0852 | 0.4724 | 0.4217 |
| 1024 | 18 | 1.8713 | 1.1517 | 0.5035 | 0.5239 |
| 2048 | 24 | 2.0504 | 1.2632 | 0.5525 | 0.6471 |
| 4096 | 35 | 2.5747 | 1.5930 | 0.6985 | 0.6496 |

SIFT1M,
D = 128,
M = 32,
nq = 10000,
topk = 100

TABLE 2

Search time for different systems with 1M vectors

| | | Us/query | | | |
|---|---|---|---|---|---|
| Nlist | Nprobe | H100 PCIe | H100 SXM | H100 SXM | ABU2.0 (1.6 G) |
| 4096 | 24 | 3.6694 | 2.2835 | 1.0044 | 0.8042 |
| 8192 | 34 | 3.7812 | 2.3652 | 1.0434 | 0.8577 |

TABLE 2-continued

Search time for different systems with 1M vectors

| | | Us/query | | | |
|---|---|---|---|---|---|
| Nlist | Nprobe | H100 PCIe | H100 SXM | H100 SXM | ABU2.0 (1.6 G) |
| 16384 | 51 | 4.5181 | 2.8335 | 1.2519 | 1.213 |
| 32768 | 69 | 5.7152 | 3.6602 | 1.6367 | 1.2330 |

SIFT10M,
D = 128,
M = 32,
nq = 10000,
topk = 100

TABLE 4

Search Time for Different Systems with 100M Vector

| | | Us/query | | | |
|---|---|---|---|---|---|
| Nlist | Nprobe | H100 PCIe | H100 SXM | H100 SXM | ABU2.0 (1.6 G) |
| 32768 | 46 | 7.8789 | 4.9323 | 2.1769 | 1.9547 |
| 65536 | 62 | 8.0214 | 5.1097 | 2.2778 | 1.4964 |

SIFT100M,
D = 128,
M = 32,
nq = 10000,
topk = 100

Correspondingly, the embodiments of the present invention also provide a computer-readable storage medium in which computer-executable instructions are stored. When the computer-executable instructions are executed by a processor, the method embodiments of the present invention are implemented. The computer-readable storage media comprises permanent and non-permanent, removable and non-removable media can be used by any method or technology to implement information storage. Information can be computer-readable instructions, data structures, program modules, or other data. Examples of storage media for computers include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only optical disc read-only memory (CD-ROM), digital multifunctional optical disc (DVD) or other optical storage, magnetic cartridge tapes, magnetic tape disk storage or other magnetic storage devices, or any other non-transport media that can be used to store information that can be accessed by computing devices. As defined herein, a computer-readable storage medium does not include transient computer-readable media (transitory media), such as modulated data signals and carriers.

In addition, an embodiment of the present invention also provides a coarse search optimization system for IVFPQ, which comprising a memory for storing computer-executable instructions, and a processor; the processor is used to execute the computer-executable in the memory to implement the steps in the above method embodiments. Wherein, the processor may be a Central Processing Unit (referred to as "CPU"), or other general-purpose processors, Digital Signal Processor (referred to as "DSP"), Application Specific Integrated Circuit (eferred to as "ASIC") and so on. The aforementioned memory can be read-only memory (ROM), random access memory (RAM), flash memory (Flash), hard disk or solid-state drive, etc. The steps of the method disclosed in various embodiments of the present application may be directly embodied as being performed by a hardware processor, or performed with a combination of hardware and software modules in the processor.

It should be noted that in this specification of the application, relational terms such as the first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a multiple elements includes not only those elements but also other elements, or elements that are inherent to such a process, method, item, or device. Without more restrictions, the element defined by the phrase "comprise(s) a/an" does not exclude that there are other identical elements in the process, method, item or device that includes the element. In this specification of the application, if it is mentioned that an action is performed according to an element, it means the meaning of performing the action at least according to the element, and includes two cases: the action is performed only on the basis of the element, and the action is performed based on the element and other elements. Multiple, repeatedly, various, etc., expressions include 2, twice, 2 types, and 2 or more, twice or more, and 2 types or more types.

All documents mentioned in this specification are considered to be included in the disclosure of this application as a whole, so that they can be used as a basis for modification when necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition, the processes depicted in the drawings do not necessarily require the specific order or sequential order shown in order to achieve the desired results. In some embodiments, multitasking and parallel processing are also possible or may be advantageous.

What is claimed is:

1. A system for vector retrieval acceleration, comprising:
a system memory for storing computer-executable instructions; and
a hardware processor programmed to execute the computer-executable instructions and function as at least one calculation module and at least one sorting acceleration module,
  wherein each calculation module comprises a first receiving end and a second receiving end for receiving a query vector block(s) and a center vector block(s) respectively, and performs operations on received query vector blocks and center vector blocks, so as to obtain a distance calculation result(s) between each query vector and all center vectors, wherein nq query vectors are divided into nq/n query vector blocks $x_q0$, $x_q1$, . . . , $$x_q\left(\frac{nq}{n} - 1\right),$$

nlist center vectors in a center vector database are divided into nlist/m center vector blocks $C_k0$, $C_k1$, . . . , $$C_k\left(\frac{nlist}{m} - 1\right),$$

each query vector block comprises n query vectors, and each center vector block comprises m center vectors, wherein nq, nlist, m, and n are integers greater than or equal to 1; and
  wherein the at least one calculation module corresponds one-to-one with the at least one sorting acceleration module, wherein each sorting acceleration module receives the distance calculation results output by a corresponding calculation module, sorts the distance calculation results, so as to obtain a sorting intermediate state, and then stores sorting intermediate states into the system memory.

2. The system according to claim 1, wherein the at least one calculation module performs operations on the center vector blocks and the query vector blocks, comprising: performing matrix multiplication operations on the query vector blocks and the center vector blocks so as to obtain matrix multiplication results, and adding each element in the matrix multiplication results to a square of the corresponding center vector to obtain the distance calculation result.

3. The system according to claim 1, wherein,
the second receiving end of each calculation module receives its corresponding center vector block from the center vector database, for the corresponding center vector block, the first receiving end of each calculation module sequentially receives each query vector block, so that each calculation module can perform operations on its corresponding center vector block with all query vector blocks;
wherein, different calculation modules correspond to different center vector blocks.

4. The system according to claim 3, wherein the first receiving ends of all calculation modules are connected together and receive the same query vector block at the same time.

5. The system according to claim 3, wherein the system further comprises a final sorting module, wherein the final sorting module obtains the sorting intermediate states from all sorting acceleration modules and performs sorting according to the sorting intermediate states to obtain a sorting result corresponding to each query vector.

6. The system according to claim 1, wherein, the first receiving end of each calculation module receives its corresponding query vector block, for the corresponding query vector block, the second receiving end of each calculation module sequentially receives each center vector block, so that each calculation module can perform operations on its corresponding query vector block with all center vector blocks;

wherein, different calculation modules correspond to different query vector blocks.

7. The system according to claim 6, wherein each calculation module is connected via a bus;

each calculation module receives different center vector blocks from the center vector database separately via its second receiving end, and sequentially flows the received center vector blocks among the calculation modules via the bus, so that each calculation module can receive different center vector blocks sequentially.

8. The system according to claim 6, wherein the sorting acceleration module loads the sorting intermediate states from the system memory and sorts the sorting intermediate states together with the distance calculation result from the at least one calculation module or a local memory to obtain a new sorting intermediate states, and updates the sorting intermediate states stored in the system memory with the new sorting intermediate states.

9. The system according to claim 8, wherein each sorting acceleration module obtains the sorting intermediate state in the last sorting as a sorting result of the query vectors in the query vector block received by the corresponding calculation module.

10. The system according to claim 1, wherein the system further comprises a local memory, and the distance calculation results calculated by the calculation modules are stored in the local memory and output to the corresponding sorting acceleration module via the local memory.

11. A method for vector retrieval acceleration, comprising:

dividing nq query vectors into nq/n query vector blocks $x_q 0, x_q 1, \ldots,$ $$x_q\left(\frac{nq}{n} - 1\right),$$

and dividing nlist center vectors in a center vector database into nlist/m center vector blocks $C_k 0, C_k 1, \ldots,$ $$C_k\left(\frac{nlist}{m} - 1\right),$$

wherein each query vector block comprises n query vectors, and each center vector block comprises m center vectors, wherein nq, nlist, m, and n are integers greater than or equal to 1;

by at least one calculation module, respectively receiving center vector block $C_k 0$, center vector block $C_k 1, \ldots,$ and center vector block $$C_k\left(\frac{nlist}{m} - 1\right)$$

from the center vector database and performing operations on each center vector block of the center vector block $C_k 0$, center vector block $C_k 1, \ldots,$ and center vector block $$C_k\left(\frac{nlist}{m} - 1\right)$$

with query vector block $x_q 0$, query vector block $x_q 1, \ldots,$ and query vector block $$x_q\left(\frac{nq}{n} - 1\right),$$

so as to obtain distance calculation results between each query vector and all center vectors; and by at least one sorting acceleration module, obtaining the distance calculation results of the center vector blocks and the query vector blocks from a corresponding calculation module and performing sorting based on the distance calculation results, to obtain a sorting result corresponding to each query vector.

12. The method according to claim 11, wherein performing operations on each center vector block with query vector block $x_q 0$, query vector block $x_q 1, \ldots,$ and query vector block $$x_q\left(\frac{nq}{n} - 1\right)$$

respectively, comprising:

performing matrix multiplication operations on each center vector block with the query vector block $x_q 0$, query vector block $x_q 1, \ldots,$ and query vector block $$x_q\left(\frac{nq}{n} - 1\right)$$

respectively, so as to obtain matrix multiplication results, and adding each element in matrix multiplication results to a square of the corresponding center vector to obtain the distance calculation results.

13. The method according to claim 12, wherein performing matrix multiplication operations on each center vector block with the query vector block $x_q 0$, query vector block $x_q 1, \ldots,$ and query vector block $$x_q\left(\frac{nq}{n} - 1\right)$$

respectively, comprising:

inputting the center vector block $C_k0$, center vector block $C_k1, \ldots$, and center vector block $$C_k\left(\frac{nlist}{m}-1\right)$$

into the corresponding calculation module of the at least one calculation module respectively; and for each calculation module, inputting the query vector block $x_q0$, query vector block $x_q1, \ldots$, and query vector block $$x_q\left(\frac{nq}{n}-1\right)$$

in sequence, so that each calculation module calculates a matrix product of the corresponding center vector block and all query vector blocks.

14. The method according to claim 12, wherein performing matrix multiplication operations on each center vector block with the query vector block $x_q0$, query vector block $x_q1, \ldots$, and query vector block $$x_q\left(\frac{nq}{n}-1\right)$$

respectively, comprising:

inputting the query vector block $x_q0$, query vector block $x_q1, \ldots$, and query vector block $$x_q\left(\frac{nq}{n}-1\right)$$

into the corresponding calculation module of at least one calculation module respectively; and for each calculation module, inputting the center vector block $C_k0$, center vector block $C_k1, \ldots$, and center vector block $$C_k\left(\frac{nlist}{m}-1\right)$$

sequentially, so that each calculation module calculates the matrix product of the corresponding query vector block and all center vector blocks.

15. The method according to claim 14, wherein via at least one sorting acceleration module, obtaining the distance calculation results of the center vector block and the query vector block from the corresponding calculation module, and performing sorting based on the distance calculation results, comprising:

the sorting acceleration module performs sorting based on the distance calculation results received from the corresponding calculation module or a local memory and the sorting intermediate states obtained from a system memory to generate new sorting intermediate states, and updates the sorting intermediate states stored in the system memory with the new sorting intermediate states.

16. The method according to claim 15, wherein sorting based on the distance calculation results to obtain sorting results corresponding to each query vector, comprising:

taking the sorting intermediate state obtained by each sorting acceleration module in the last sorting as the sorting result of the corresponding query vector in the query vector block received by the corresponding calculation module.

17. The method according to claim 13, wherein performing sorting based on the distance calculation results to obtain the sorting results corresponding to each query vector, comprising: obtaining the sorting intermediate states of all sorting acceleration modules and sorting according to the sorting intermediate states to obtain the sorting results corresponding to each query vector via a final sorting module.

18. A non-transitory computer-readable medium that stores computer executable commands which are executed by a processor to implement steps in the method according to claim 11.

* * * * *